US009834048B1

(12) United States Patent
Price

(10) Patent No.: US 9,834,048 B1
(45) Date of Patent: Dec. 5, 2017

(54) CHAIN INSTALLATION SYSTEM FOR SEMI-TRUCKS AND TRAILERS

(71) Applicant: Richard D Price, Woodland Hills, UT (US)

(72) Inventor: Richard D Price, Woodland Hills, UT (US)

( * ) Notice: Subject to any disclaimer, the term of this patent is extended or adjusted under 35 U.S.C. 154(b) by 0 days.

(21) Appl. No.: 14/833,698

(22) Filed: Aug. 24, 2015

Related U.S. Application Data

(60) Provisional application No. 62/041,564, filed on Aug. 25, 2014.

(51) Int. Cl.
*B60C 27/00* (2006.01)
*B25B 27/22* (2006.01)
*B60C 27/06* (2006.01)

(52) U.S. Cl.
CPC ............ *B60C 27/003* (2013.01); *B25B 27/22* (2013.01); *B60C 27/062* (2013.01)

(58) Field of Classification Search
CPC ....... B25B 27/22; B60C 27/00; B60C 27/003; B60C 27/065; B60C 27/14; B60C 27/145; B60C 27/062
USPC ........................ 81/15.8; 152/213 R, 214, 215
See application file for complete search history.

(56) References Cited

U.S. PATENT DOCUMENTS

| | | | | |
|---|---|---|---|---|
| 1,211,597 A * | 1/1917 | Kress | ................ | B60C 27/145 152/214 |
| 1,346,469 A * | 7/1920 | Schneider | ............. | B60C 27/145 152/215 |
| 1,404,690 A * | 1/1922 | Farran | .................... | B60C 27/145 152/215 |
| 1,466,374 A * | 8/1923 | Hart | ....................... | B60C 27/145 152/214 |
| 1,657,848 A * | 1/1928 | Vordemfelde | .......... | B25B 27/22 152/215 |
| 1,766,634 A * | 6/1930 | Hill | ....................... | B60C 27/145 152/215 |
| 1,951,761 A * | 3/1934 | Innace Legg | ......... | B60C 27/145 152/216 |
| 2,489,986 A * | 11/1949 | St Pierre | ................ | B65D 77/08 206/229 |
| 2,768,545 A * | 10/1956 | Bertelsen | ............... | B60C 27/145 152/213 R |
| 2,771,929 A * | 11/1956 | Alterio | .................... | B60C 27/02 152/222 |
| 3,381,556 A * | 5/1968 | Pisciotta | ................. | B60C 27/14 152/213 R |
| 3,937,263 A * | 2/1976 | Hill | ....................... | B60C 27/003 152/213 R |
| 4,476,907 A * | 10/1984 | Odawara | ................. | B60C 27/06 152/179 |

(Continued)

*Primary Examiner* — Kip T Kotter

(57) ABSTRACT

A snow chain system that attaches to the frame of a semi-truck and/or trailer, or a large commercial construction vehicle. The system includes a removable chain box, a chain barrel, a chain spreader, flashlight driver notification, a drag brake, a box swivel, and tire clamp. The snow chain is rolled out of the chain box directly onto a tire tightly with minimal human involvement. It provides for installed a tight snow chain onto the tire when rollout of the snow chain to the tire is completed. After snow chain use, it rolls up manually back into the chain box and is ready for immediate service should another need arise. All necessary equipment is organized, helping the driver with safety concerns.

7 Claims, 9 Drawing Sheets

(56) References Cited

U.S. PATENT DOCUMENTS

| | | | | |
|---|---|---|---|---|
| 5,273,092 A | * | 12/1993 | Simpson | ............... B25B 27/22 152/213 R |
| 2001/0027596 A1 | * | 10/2001 | Lyne, Jr. | ............... B25B 27/22 29/407.01 |
| 2002/0066508 A1 | * | 6/2002 | Amyotte | ............... B60C 27/145 152/214 |

* cited by examiner

CHAIN INSTALLATION SYSTEM FOR SEMI-TRUCKS AND TRAILERS

PRIORITY

This application claims priority to provisional application No. 62/041,564 filed Aug. 25, 2014 which is hereby incorporated by reference.

BACKGROUND

This snow chain roll out-roll-up system assists semi-truck drivers as they place snow chains on semi-trucks in snow, ice covered road conditions. This system provides a convenient method for drivers to store and apply their snow chains in a more organized, rapid, and convenient way. Whether it be 2, 4, or 10, all tires can be rolled out at once. It means drivers will spend less time and effort in hazardous weather conditions, keeping them dry, safe and on their way quickly and easily. Because the system is more organized, rapid and convenient, the truck driver may be more inclined to apply his snow chains earlier and more often.

Since snow chains for semi-truck tires were invented many years ago, they conventionally have maintained their position as a good means of traction during snow and ice covered road conditions throughout the U.S. today. Snow chains are very strong, heavy duty and capable to handle most on and off-road applications safely. Snow chains are usually purchased in cloth bags. Some semi-truck drivers often store their snow chains in the purchased bags in the cabs of their trucks. Others store them on constructed posts outside the bag, on the truck, outside the cab. Chains stored in these manners are likely to end up tangled, very cold, wet and rusty. Often semi-truck and trailer tires are different wheel sizes, which require different snow chains sizes as well. During hazardous road conditions, the truck driver is faced with separating appropriate chain and wheel sizes which adds to possible mistakes and could create dangerous conditions on the road for themselves and others. Additionally, the American Trucking Association indicates annual semi-truck driver turn-over to be approximately 80% per year in the U. S. Many new truck drivers have little experience applying snow chains during their first year.

DOT snow chain laws vary, but California leads in regulating semi-truck chain law. An example is Interstate 80 at Donner Summit in California. Donner Summit regulations have two levels of chain control for semi-truck and trailers:

MAXIMUM is four snow chains on the cab and two on the trailer.

MINIMUM is two snow chains on the cab and two on the trailer. The minimum chain requirement is "on" for most storms. Driver time to install snow chains varies according to how organized, experienced, and prepared the semi-truck driver is for snow, ice and blizzard conditions.

The present invention in its various embodiments addresses the foregoing issues.

SUMMARY

The invention in its various embodiments includes the following features. It is a snow chain system which attaches to the frame of large vehicles including but not limited to semi trucks and trailers. The snow chain system has been engineered to meet all DOT requirements and regulations for weight and strength. The system includes a chain box, a unique chain barrel, a chain spreader, a drag brake mechanism, a box swivel, combination manual wind up handle/cam tightener, a tire clamp, and two high rise chain leader hooks. A standard snow chain is used. In one embodiment, the tire clamp is placed and tightened onto the chosen tire and approximately two feet of leader open hook chain is rolled out of the chain box manually and connected to the tire clamp chain posts. The drag is adjusted, tight or loose, from the drag brake threaded adjustment bolt on the axle housing to keep the chain reasonably tight during rollout and keeps the chain end from unraveling uncontrollably.

The vehicle driver rolls the vehicle one full wheel turn pulling the snow chain onto the tire. An optional flashlight notification on the tire clamp flashes to the driver in the rear view mirror, when one full wheel has been turned. The driver connects and tightens the chain together manually using the cam tightener. All tires requiring chains can be rolled out at the same time for all wheels.

After chain use, the driver disconnects the chain, drives vehicle off the chain and winds the chain into the box manually. In one embodiment, the box handle is used to roll up the chain across the chain spreader and onto the chain barrel. A drag brake can be utilized to keep the chain from unraveling in the box during rollout or road travel. The chain box swivel allows the box front to be faced conveniently for roll up of the snow chain and provides a work and storage area for the driver.

DETAILED DESCRIPTION OF THE DRAWINGS

Figure 1:
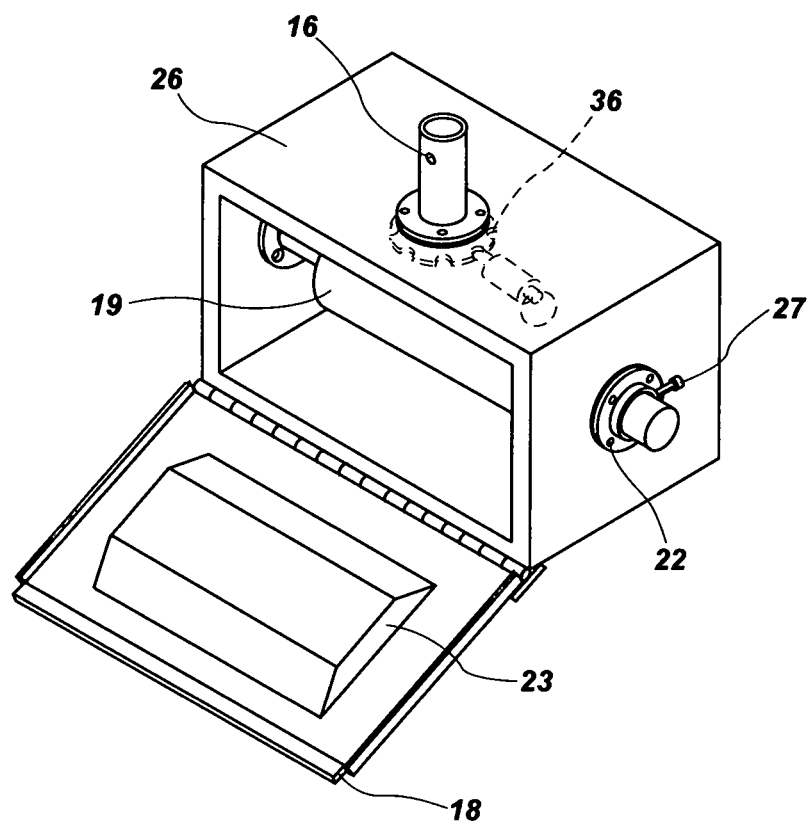
FIG. 1 is a front perspective view of a chain box according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Referring to FIG. 1, a front perspective view of a chain box (26) according to one embodiment of the present invention is shown. Chain box (26) includes a box. Chain box swivel (36) is located at the outside top center and inside top center of the box (26). It swivels for statutory compliance of DOT vehicle width regulations during road travel. It is also used to move the chain box (26) to a different angle for chain rollup convenience. Removable box pin (16) in the chain box swivel axle (36) is to separate or remove the entire chain box (26) from the vehicle. At both sides of the chain box (26) on the axle housing (22), is a drag brake threaded adjustment bolt (27) which places more or less pressure on the smaller part of the chain barrel (19) which slows down or speeds up the chain barrel (19) roll. It is noted that, as used herein, "chain barrel" is not intended to be limited to a particular cylindrical shape, or size, though such a shape, or size, is well suited for use with the present invention. Chain Barrel (19) could be substantially circular in cross section, substantially polygonal in cross section, or combinations thereof. Numerous other chain barrel (19) configurations as would be apparent to one skilled in the art are considered to be within the scope of the present invention. Chain spreader (23) aligns the entire snow chain (24) across the chain spreader (23) during rollup of the chain. Chain box wear bar (18) is the initial contact of a snow chain (24) during rollup which protects and begins the spreading of the snow chain (24).

Figure 2:
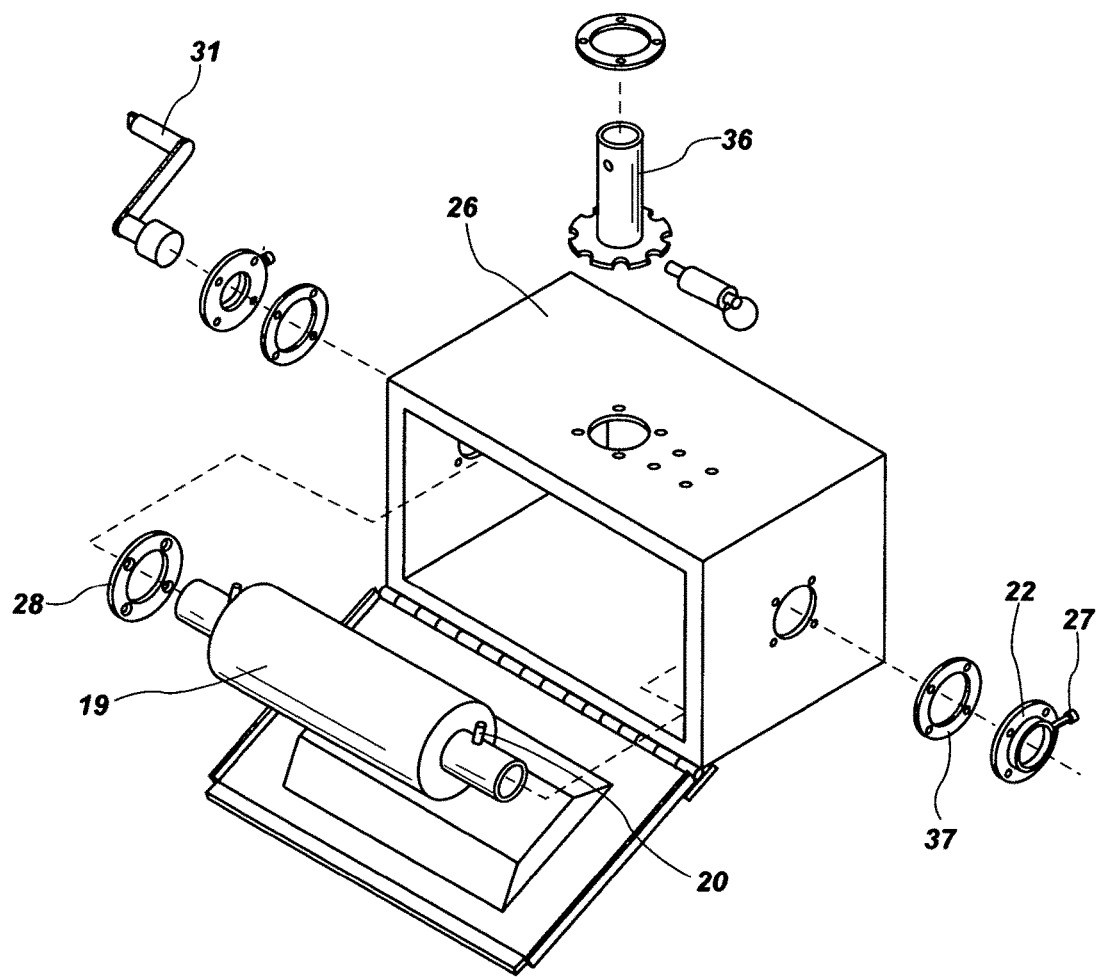
FIG. 2 is a front perspective view of a partially disassembled chain box according to one embodiment of the present invention.

Referring to FIG. 2, the backing plate (28) which tightens components of the snow chain system that are outside of the chain box (26) to components within the chain box (26) is shown according to one embodiment of the present invention. Two chain barrel leader posts (20 & 21) are built into the chain barrel (19). Chain barrel (19) is removable from the inside of the chain box (26) for maintenance.

Figure 3:
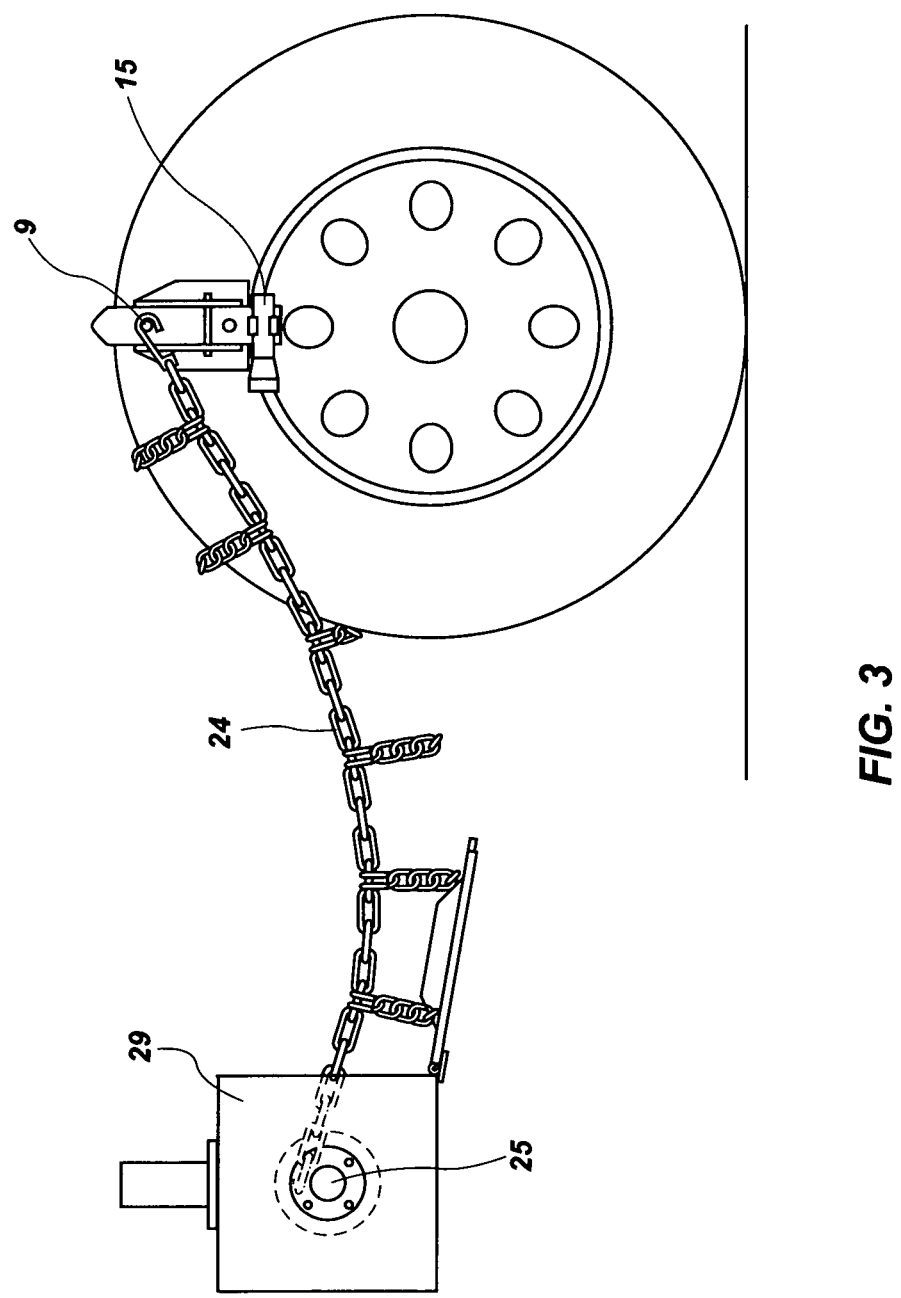
FIG. 3 is a side view of a tire clamp and chain box according to one embodiment of the present invention.

FIG. 3 depicts a rollout view with snow chain (24) attaching to the metal tire clamp (14) onto chain post (9 & 10) according to one embodiment of the present invention. Its purpose is to attach the snow chain (24) to the tire, preparatory for rollout of the snow chain (24). This side view illustrates a standard small flashlight (15), attached to the tire clamp (14) snapped into its flashlight snap in holder, which signals to the driver, during rollout, when one full tire turn is achieved. Either chain box (26) side has a box handle opening (25) and can receive the box handle (31) for manual roll up or roll out of snow chain (24).

Figure 4:
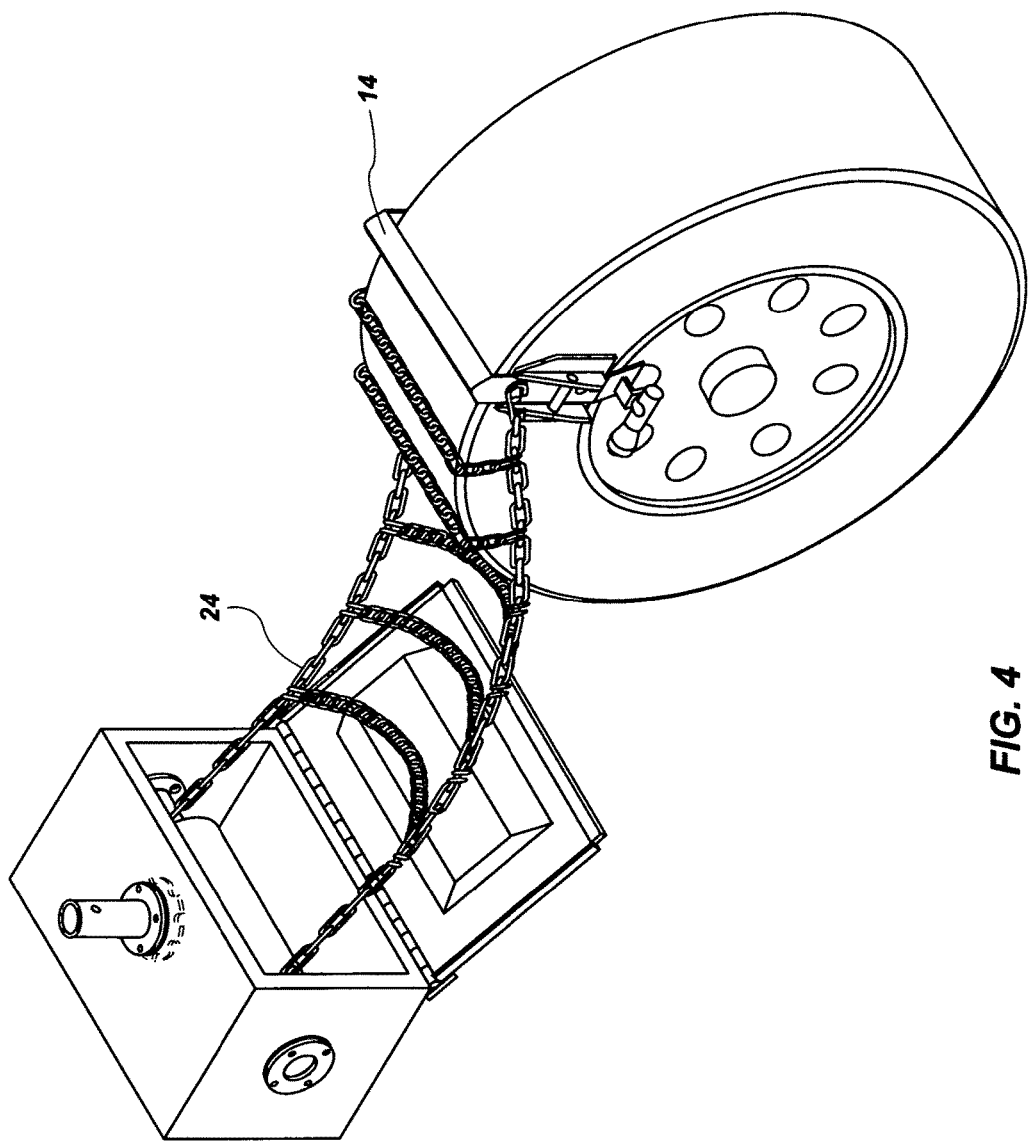
FIG. 4 is an elevated perspective of a tire clamp and chain box with the chain completely unrolled according to one embodiment of the present invention.

FIG. 4 illustrates the end of the chain rollout. It is illustrated to show the necessity of the drag brake threaded adjustment bolt (27) towards the end of the rollout. There is approximately two and ½ feet at the end of the snow chain (24) that will flap and rollout uncontrollably without the drag brake threaded adjustment bolt (27). Snow chain (24) is held back by the drag brake threaded adjustment bolt (27) until the snow chain is tight enough to pull the end of the snow chain (24) from the chain barrel leader post (20 & 21).

Figure 5:
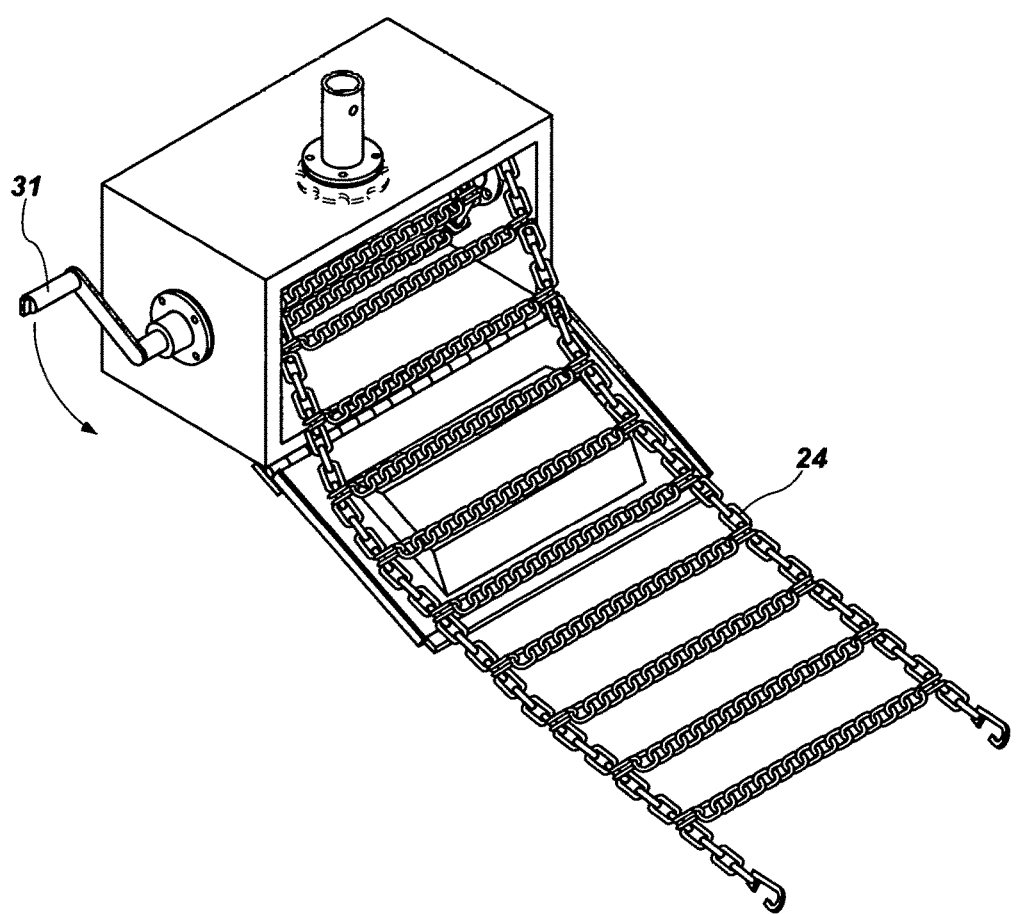
FIG. 5 is an elevated view of a chain box depicting a chain roll-up from the ground according to one embodiment of the present invention.
Figure 6:
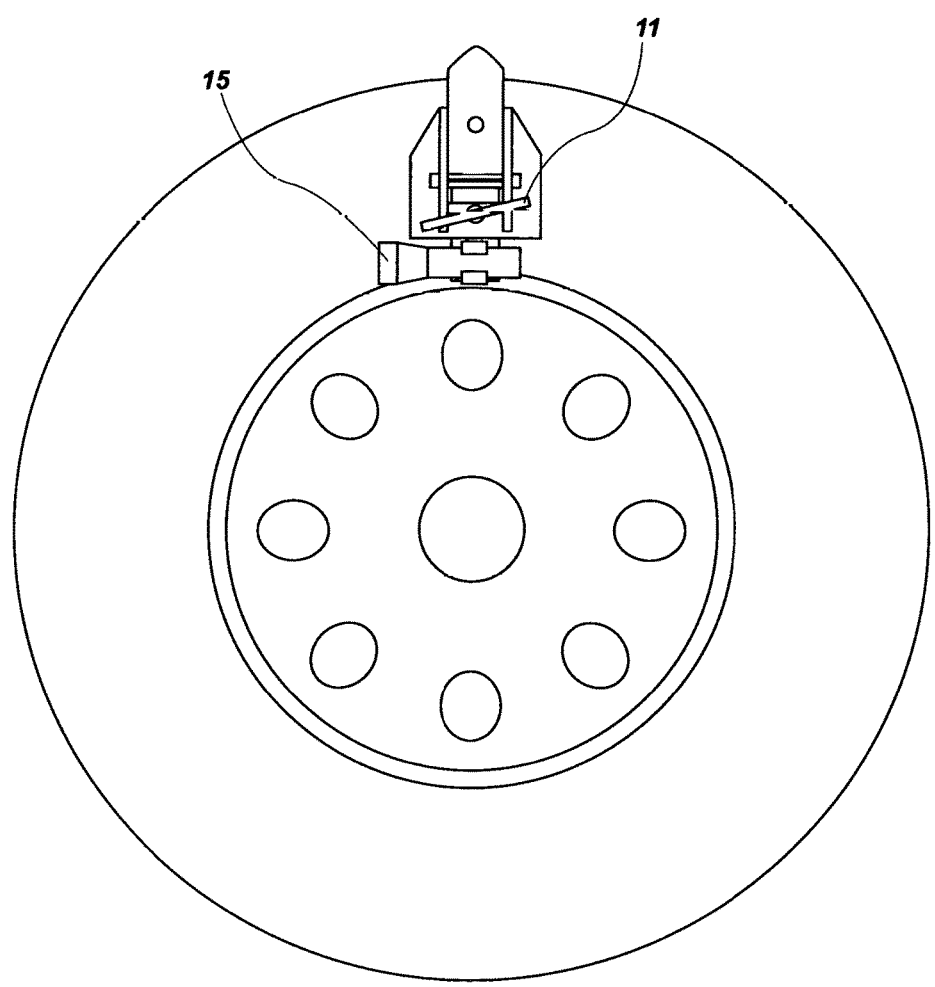
FIG. 6 is a side view of a tire clamp according to one embodiment of the present invention.
Figure 7:
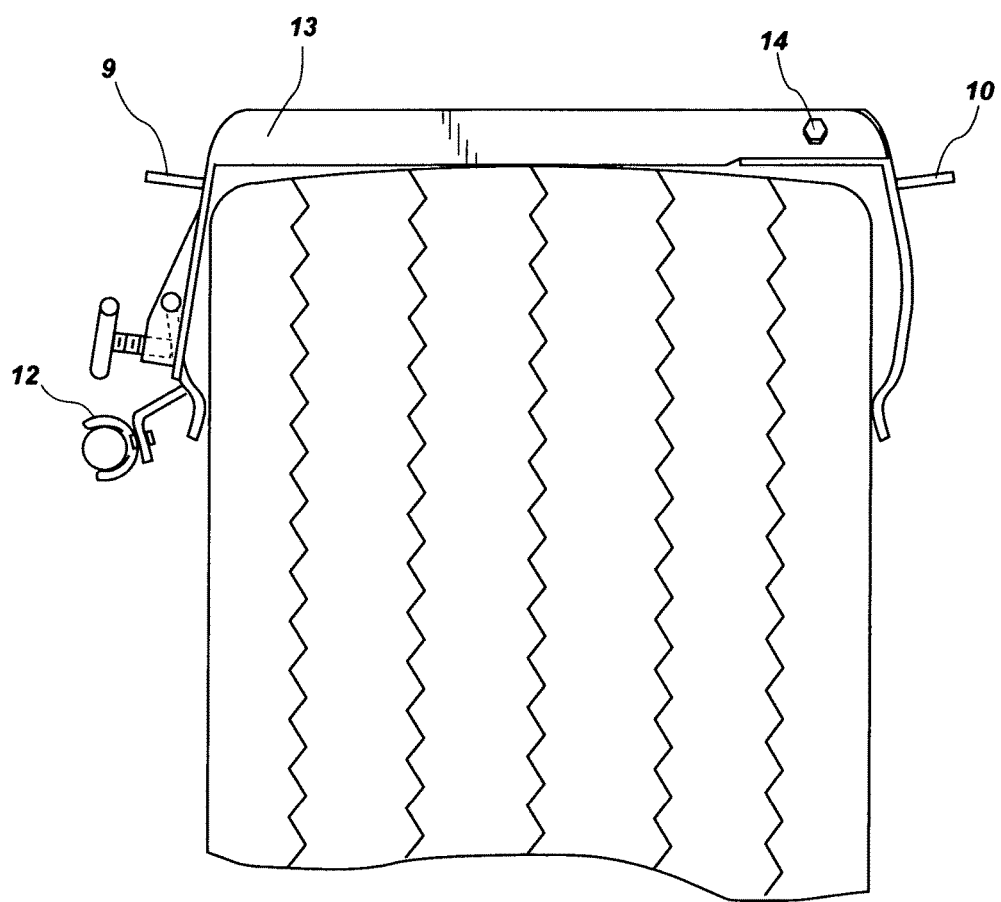
FIG. 7 is a front view of a tire clamp according to one embodiment of the present invention.

Referring to FIGS. 5-7, the snow chain (24) is typically rolled up into the chain box (26), from the ground manually, using the box handle (31). FIG. 6 is a side view of the tire clamp (14) with the flashlight (15). Flashlight (15) is in an "on" position during rollout of snow chain (24) and in "off" position when snow chain (24) is not in use. Tire clamp (14) ordinarily will be positioned on the tire about half way up the vehicle/trailer tire toward the chain box (26). Tire clamp (14) in this embodiment has roughed metal on both insides of the lower tire clamp (14) for a secure tire grip. Tire clamp (14) is two pieces on the clamp t-handle tightener (11) side. Lower arm presses to the lower part of the tire only, to get grip, while the other arm remains stationary. Clamp t-handle tightener (11) provides leverage to the pivotal clamp lower side increasing its grab and holding ability. In FIG. 6, a side view of the flashlight (15) and flashlight snap in holder (12) is illustrated (note flashlight snap in holder (12) is not labeled in FIG. 6). Referring to FIG. 7, a front view of the metal tire clamp triangle (13), illustrating both chain post positions (9 & 10) is shown. This clamp (14) provides for many tire width configurations including but not limited to low profile super singles, 22", and 24" wheels rims.

In one embodiment, in the inside piece of the metal tire clamp triangle (13), holes are drilled across the inside piece of the triangle (13). Selecting proper width tire clamp (14) is accomplished by removing the bolt and nut and moving them through other drilled holes provided.

Figure 8:
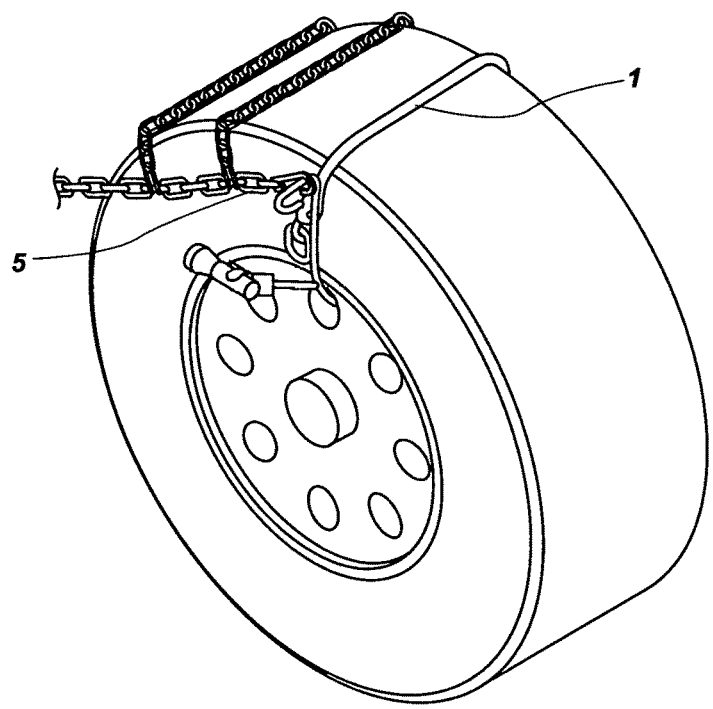
FIG. 8 is a perspective view of a tire clamp according to one embodiment of the present invention.
Figure 9:
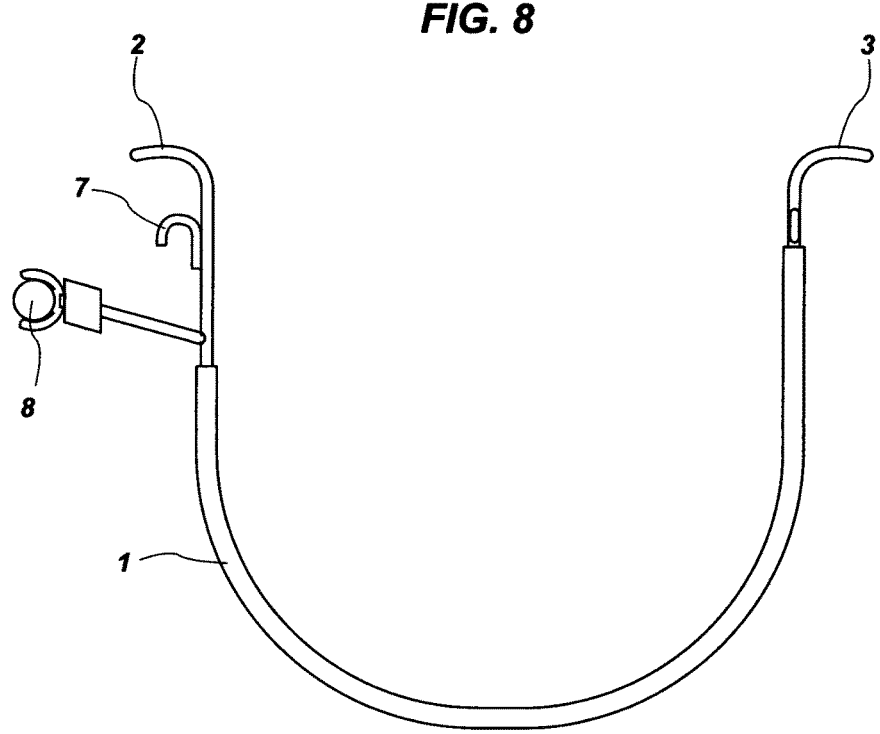
FIG. 9 is a front view of the tire clamp depicted in FIG. 8.

Referring to FIGS. 8 & 9, the tire clamp (1) is illustrated according to another embodiment of the present invention. It performs the same service as metal tire clamp (14). Chain open hook (5 & 6) is shown hooked to the tire clamp chain post (2 & 3). Tire clamp (1) strap is hooked through the most convenient front wheel opening. Tire clamp (1) strap is pushed through the wheel opening up through the back side of the tire. The driver feels, finds, and pulls the tire clamp (1) strap from the back side of the tire, straightens the tire clamp (1) over the tire, and hooks it onto the strap hook (7) fastener, as shown in FIG. 8. In some embodiments, the tire clamp (1) strap is equipped with a standard rubber to pull over and wrap around the tire wear area. This allows the tire clamp (1) to be used on uneven surfaces and poorly maintained road surface.

Leader chain hooks (5 & 6) are hooked over chain post (2 & 3) to secure the snow chain (24) to the tire clamp (1) strap. It is noted that the color yellow is used for the chain hooks and chain posts as an example, but numerous other colors and color coding mechanisms as would be apparent to one skilled in the art could be utilized with the present invention in its various embodiments. Strap material may be purchased for tire size and width. Additionally, a good grip is provided during inclement weather.

Figure 10:
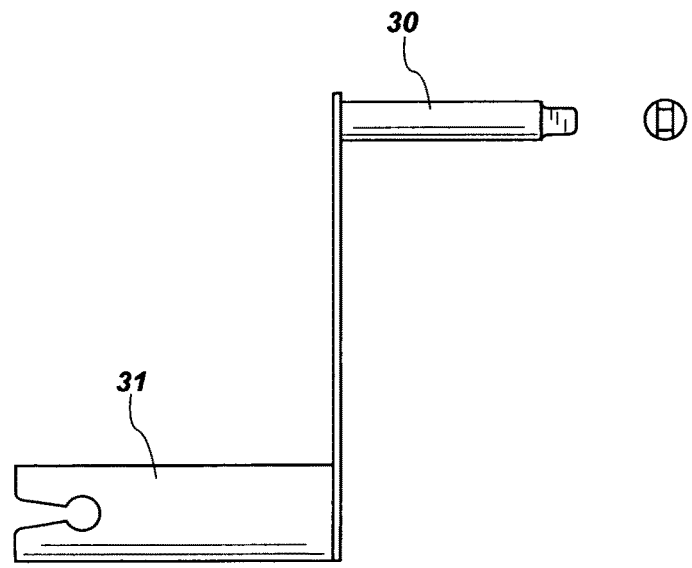
FIG. 10 is a box handle/cam tightener according to one embodiment of the present invention.

Referring to FIG. 10, a combination box handle/cam tightener (30 & 31) is shown according to one embodiment of the present invention. The box handle (31) is placed into the box handle opening (25) for box manual wind up. Included in the box handle (31) is a partial circular cutout. The box handle (31) fits into the chain barrel leader post (20) inside the hollow chain barrel (19). It holds it in place and allows the chain barrel (19) to rotate. Tire clamp (14) simply presses down over the tire and is tightened. To take off untighten and pull off the tire.

One safety feature of the metal tire clamp (14) is that, should the driver forget to remove them from the vehicle, the tire clamp triangle (13) located on the wear side of the tire is raised to create a rocking of the vehicle to notify the driver of the condition.

CAM tightener (30) end is used as one handle for rolling up snow chain (24). Process is reversed for cam tightening. Box handle (31) is used to insert into the standard snow chain (24) cam to tighten the snow chain (24). Cam tightener is a real gift to the trucking industry. It provides torque for solid tightening of the snow chain (24).

Figure 11:
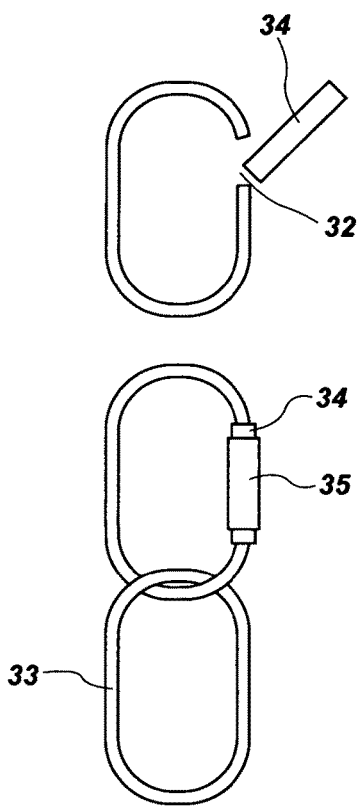
FIG. 11 depicts a high cut open hook according to one embodiment of the present invention having an optional latex, rubber or plastic sleeve and collar.

Referring to FIG. 11 a high cut open hook (32) designed for ease of chaining and increased tightening of the snow chain (24) is shown according to one embodiment of the present invention. It is an accessory to the chain system. It enables the driver to obtain a tighter chain by hooking one additional loop.

A tighter chain is accomplished by cutting the latex sleeve to fit over the bottom of the open loop high cut (32) and the cut opening. Place the latex sleeve (34) over the bottom of the loop (32) and all of the cut opening and farther into the top open high cut (32). To tie two loops together, hand push the closed loop (33) thru the latex sleeve (34) into the loop inside of the high cut loop (32). Latex sleeve (34) can then be pushed up into the high side end of the high cut (32) loop.

Optionally, after a closed loop (33) push through is successfully accomplished, the metal collar (35) is fitted over the soft sleeve (34), and onto the loop bottom side of the open high cut (32). By pushing the latex sleeve closed loop push through (33) up over the cut opening (32), the collar (35) provides maximum hold. The advantage of connecting this high cut, closed push thru loop (33) link is it is faster, uses no other tools and it works with little or no down side.

In one embodiment, the clamp chain post (2 & 3) is built to bend releasing the snow chain (24) should the chain barrel (19) stop unwinding the snow chain (24) during rollout. The clamp post (2 & 3) can be returned to normal position thus saving severe damage and loss of snow chains (24).

Illustrative Methods of Operation
Standard Chain Box—Trailer Installation Only

The driver begins by attaching the tire clamp onto the tire by hand. The driver simply rolls-out a small amount of snow chain from the chain box by hand and hooks it to the tire clamp. Either tire clamp on the driver's side of the vehicle, is equipped with a bright flashlight snap in which, may be turned ON by the driver for roll-out. The flash light moves around the wheel with the tire. The driver then follows with the same procedure for all tires needing chains.

The driver then drives the vehicle one wheel turn—to roll-out all snow chains, from all of the chain boxes onto all the tires. Two chain boxes are typically required for one axle (one on each outside tire). The tire clamp light notifies the driver when the tire has reached the full turn by shining the light back to him at the same point where he/she started. This eliminates the driver guessing how far the tire has traveled around the wheel.

The chain boxes are mobile boxes that can be attached, at will, by simply sliding the chain box onto the box swivel structure and securing it with a large metal pin. It can be stored in an organized fashion elsewhere. The chain box slides into the sleeve box swivel structure at the box top, under the floor structure of the trailer and connects to the new structure attached to the wheel main frame of a trailer.

The chain box attached to the trailer frame is designed to move with the standard trailer "slider" system meaning it maintains the same distance with the trailer wheels no matter where the wheels are positioned under the trailer by the standard "slider" mechanism. The chain box is physically designed on a swivel pipe hinge that swivels out, for the driver, to allow the driver (operator) to swivel the chain box out from safe keeping under the trailer, or next to the flat bed type frame, square on the tires. The chain box will be positioned on the edge or just outside of the bed trailer frame to line up the rolled up chain square onto the tire.

Tractor (Truck) Only Installation:

Chain boxes are fitted and attached behind drive wheels on tractors. Snow chains are placed on the rear drive axle of tractors next to the chain boxes. One option of the "truck" chain box is to replace the standard rear drive mud flap and alter or reattached it as part of the chain box as to reduce the small space available. An alternate method is to install the chain box onto the trailer with a sleeve ball bearing rail to move forward to the tractor roll-out position behind the last drive tractor axle.

Tractor and Trailer Installation:

The system can be color coded for ease of new drivers. It uses the designed "high rise" open hook. The chain box drag brake causes pressure on the chain roller during rollout. It is designed to permit the driver to keep adjustable drag on the chain and keep the chain reasonably tight during the roll-out. It also controls the chain box barrel from unraveling the chain prematurely to the ground during roll-out of the chain to the wheel.

The chain box spreader is located on the inside of the door. After chain use, the door is open during roll-up of the snow chain, or at any time the driver chooses to use it to untangle chain, find chain binds, broken chain, etc. This open front door can be used for chain maintenance while standing up—not in the snow. During roll-up of the snow chain, it moves across the chain spreader spreading the snow chain for the barrel inside the chain box which also continues the spreading of the chain. The driver monitors the snow chain as it passes across the box chain spreader into the chain box.

The chain box handle is used to hand roll up the snow chain onto the barrel inside the chain box. It is also used to tighten each cam on the snow chain. The box handle is designed to provide enough hand torque to overcome the friction generated (metal on metal) of the cam. This allows the snow chain to be pulled tightly around the tire reducing the risk of losing a snow chain or driving with a snow chain that hovers over the tire while traveling.

The chain box barrel is uniquely designed in organizing and separating the snow chain as it is rolled-up in the chain box so that the rails of the chain are stretched and separated from the cross chain. The cross chain is rolled up into the middle barrel.

The invention claimed is:

1. A snow chain installation system for semi-truck and trailers comprising:
   a) a chain box including a rotating barrel, a drag brake, and a chain spreader;
   b) a tire clamp; and
   c) a snow chain having a first end removably attached to the rotating barrel and a second end removably attached to the tire clamp;

wherein the rotating barrel comprises a large central portion positioned between two smaller end portions, each smaller end portion including a chain barrel leader post extending therefrom, the drag brake comprises a threaded adjustment bolt on each side of the chain box configured to exert a force on the two smaller end portions of the rotating barrel to control an unraveling of the snow chain, the snow chain being removably attached to the rotating barrel at the chain barrel leader posts, and the chain spreader aligns the snow chain across the chain spreader during a rollup of the snow chain.

2. The snow chain installation system of claim 1 wherein the tire clamp is a solid clamp.

3. The snow chain installation system of claim 1 wherein the chain box includes a substantially 360 degree swivel.

4. The snow chain installation system of claim 1 wherein the chain box includes a wear bar.

5. The snow chain installation system of claim 1 wherein the snow chain installation includes a flashlight attached to the tire clamp.

6. The snow chain installation system of claim 1 wherein the tire clamp includes two failsafe clamp posts.

7. The snow chain installation system of claim 1 further comprising a combination box handle/cam tightener.

* * * * *